US011175076B2

(12) United States Patent
Kopko et al.

(10) Patent No.: US 11,175,076 B2
(45) Date of Patent: Nov. 16, 2021

(54) FREE COOLING REFRIGERATION SYSTEM

(71) Applicant: Johnson Controls Technology Company, Milwaukee, WI (US)

(72) Inventors: William L. Kopko, Jacobus, PA (US); Mustafa K. Yanik, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 339 days.

(21) Appl. No.: 15/796,483

(22) Filed: Oct. 27, 2017

(65) Prior Publication Data

US 2018/0120005 A1    May 3, 2018

Related U.S. Application Data

(63) Continuation of application No. 12/726,895, filed on Mar. 18, 2010, now abandoned.

(60) Provisional application No. 61/162,825, filed on Mar. 24, 2009.

(51) Int. Cl.
| | |
|---|---|
| *F25B 41/00* | (2021.01) |
| *F25B 25/00* | (2006.01) |
| *F25B 40/02* | (2006.01) |
| *F25B 40/04* | (2006.01) |
| *F25D 16/00* | (2006.01) |

(52) U.S. Cl.
CPC ............ *F25B 41/00* (2013.01); *F25B 25/005* (2013.01); *F25B 40/02* (2013.01); *F25B 40/04* (2013.01); *F25D 16/00* (2013.01); *F25B 2600/13* (2013.01); *F25B 2700/21* (2013.01); *F25B 2700/2106* (2013.01); *Y02B 30/70* (2013.01)

(58) Field of Classification Search
None
See application file for complete search history.

(56) References Cited

U.S. PATENT DOCUMENTS

| | | | |
|---|---|---|---|
| 2,620,635 A | 12/1952 | Mautner et al. | |
| 2,791,891 A * | 5/1957 | Lance | F25B 39/04 62/509 |
| 3,640,084 A | 2/1972 | Hopkins et al. | |

(Continued)

FOREIGN PATENT DOCUMENTS

| | | |
|---|---|---|
| CH | 392576 | 5/1965 |
| DE | 3130390 | 2/1983 |

(Continued)

OTHER PUBLICATIONS

Extended European Search Report for European application No. 10003033.7, dated Jun. 25, 2013, pp. 1-11.

*Primary Examiner* — Christopher R Zerphey
(74) *Attorney, Agent, or Firm* — Fletcher Yoder, P.C.

(57) ABSTRACT

A refrigeration system includes a chiller with an integrated free cooling system and refrigeration system. In certain embodiments, the chiller may be a single package unit with all equipment housed within the same support frame. The chiller may generally include three modes of operation: a first mode that employs free cooling, a second mode that employs free cooling and implements a refrigeration cycle, and a third mode that uses the free cooling system to remove heat from the refrigeration system. A heat exchanger may be shared between the free cooling system and the refrigeration system to transfer heat from the refrigeration system to the free cooling system.

17 Claims, 9 Drawing Sheets

(56) References Cited

U.S. PATENT DOCUMENTS

| | | |
|---|---|---|
| 3,864,930 A | 2/1975 | Hopkins |
| 4,199,955 A * | 4/1980 | Jonsson ............... F25B 29/003 165/133 |
| 4,199,995 A | 4/1980 | Murakami |
| 4,406,138 A | 9/1983 | Nelson |
| 4,474,022 A | 10/1984 | Puskar |
| 4,495,777 A | 1/1985 | Babington |
| 4,567,733 A | 2/1986 | Mecozzi |
| 4,932,221 A | 6/1990 | Shimizu et al. |
| 5,797,275 A | 8/1998 | Forsman |
| 5,970,729 A | 10/1999 | Yamamoto et al. |
| 6,018,954 A | 2/2000 | Assaf |
| 6,023,935 A | 2/2000 | Okazaki et al. |
| 6,142,222 A | 11/2000 | Kang et al. |
| 6,508,068 B2 | 1/2003 | Ohkawara |
| 6,640,561 B2 | 11/2003 | Roberto |
| 7,036,330 B2 | 5/2006 | Grabon et al. |
| 7,581,409 B2 | 9/2009 | Bailey et al. |
| 7,658,079 B2 | 2/2010 | Bailey et al. |
| 7,913,506 B2 | 3/2011 | Bittner et al. |
| 8,020,390 B2 | 9/2011 | Hamann et al. |
| 8,051,669 B2 | 11/2011 | Imai et al. |
| 8,117,859 B2 | 2/2012 | Chessel et al. |
| 8,166,776 B2 | 5/2012 | Kopko et al. |
| 2003/0188543 A1 | 10/2003 | Trecate |
| 2005/0150410 A1 | 7/2005 | Haas et al. |
| 2005/0284169 A1 | 12/2005 | Tamura et al. |
| 2008/0092573 A1 | 4/2008 | Vaisman et al. |

FOREIGN PATENT DOCUMENTS

| | | |
|---|---|---|
| DE | 3341853 | 6/1984 |
| EP | 0911156 | 4/1999 |
| EP | 1533116 | 5/2005 |
| EP | 1855070 | 11/2007 |
| GB | 2145217 | 3/1985 |
| JP | 10300265 | 11/1998 |
| JP | 2004132651 | 4/2004 |
| WO | 8103062 | 10/1981 |
| WO | 0165188 | 9/2001 |
| WO | 2006045040 | 4/2008 |
| WO | 2008045039 | 4/2008 |
| WO | 2008045084 | 4/2008 |
| WO | 2008045086 | 4/2008 |
| WO | 2008061297 | 5/2008 |
| WO | 2008061960 | 5/2008 |
| WO | 2008063256 | 5/2008 |
| WO | 2008105763 | 9/2008 |
| WO | 2008105868 | 9/2008 |

* cited by examiner

FREE COOLING REFRIGERATION SYSTEM

CROSS REFERENCE TO RELATED APPLICATIONS

This application is a continuation of U.S. patent application Ser. No. 12/726,895, entitled "Free Cooling Refrigeration System," filed Mar. 18, 2010, which claims priority from and the benefit of U.S. Provisional Application Ser. No. 61/162,825, entitled "Free Cooling Refrigeration System," filed Mar. 24, 2009, which are hereby incorporated by reference in their entireties.

BACKGROUND

The invention relates generally to free cooling refrigeration systems.

Many applications exist for refrigeration systems including residential, commercial, and industrial applications. For example, a commercial refrigeration system may be used to cool an enclosed space such as a data center, laboratory, supermarket, or freezer. Very generally, refrigeration systems may include circulating a fluid through a closed loop between an evaporator where the fluid absorbs heat and a condenser where the fluid releases heat. The fluid flowing within the closed loop is generally formulated to undergo phase changes within the normal operating temperatures and pressures of the system so that considerable quantities of heat can be exchanged by virtue of the latent heat of vaporization of the fluid.

Refrigeration systems may operate with a free cooling system or loop when ambient temperatures are low. The free cooling system may exploit the low temperature of the ambient air to provide cooling without the need for an additional energy input from, for example, a compressor, a thermoelectric device, or a heat source. Typically, free cooling systems may employ a separate heat exchanger or portion of a heat exchanger coil when operating in a free cooling mode. When free cooling is not desired, or feasible, the separate heat exchanger or coil portion may not be utilized.

SUMMARY

The present invention relates to a refrigeration system with a free cooling system configured to exchange heat between a cooling fluid and ambient air. The refrigeration system also includes a heat exchanger configured to receive refrigerant and to transfer heat from the refrigerant to the cooling fluid.

The present invention also relates to a refrigeration system with a vapor-compression refrigeration system that includes an evaporator configured to remove heat from a cooling fluid circulating through a cooling loop, a free cooling system configured to circulate the cooling fluid through a first circuit to exchange heat between the cooling fluid and ambient air without implementing a vapor-compression cycle, and a second circuit disposed in the free cooling system and configured to circulate an isolated portion of the cooling fluid through a heat exchanger common to the vapor-compression refrigeration system and the free cooling system.

The present invention further relates to a method for operating a refrigeration system that includes operating a vapor-compression refrigeration system to remove heat from a cooling fluid and circulating an isolated portion of the cooling fluid within a free cooling system to remove heat from the vapor-compression refrigeration system.

DRAWINGS

DETAILED DESCRIPTION

Figure 1:
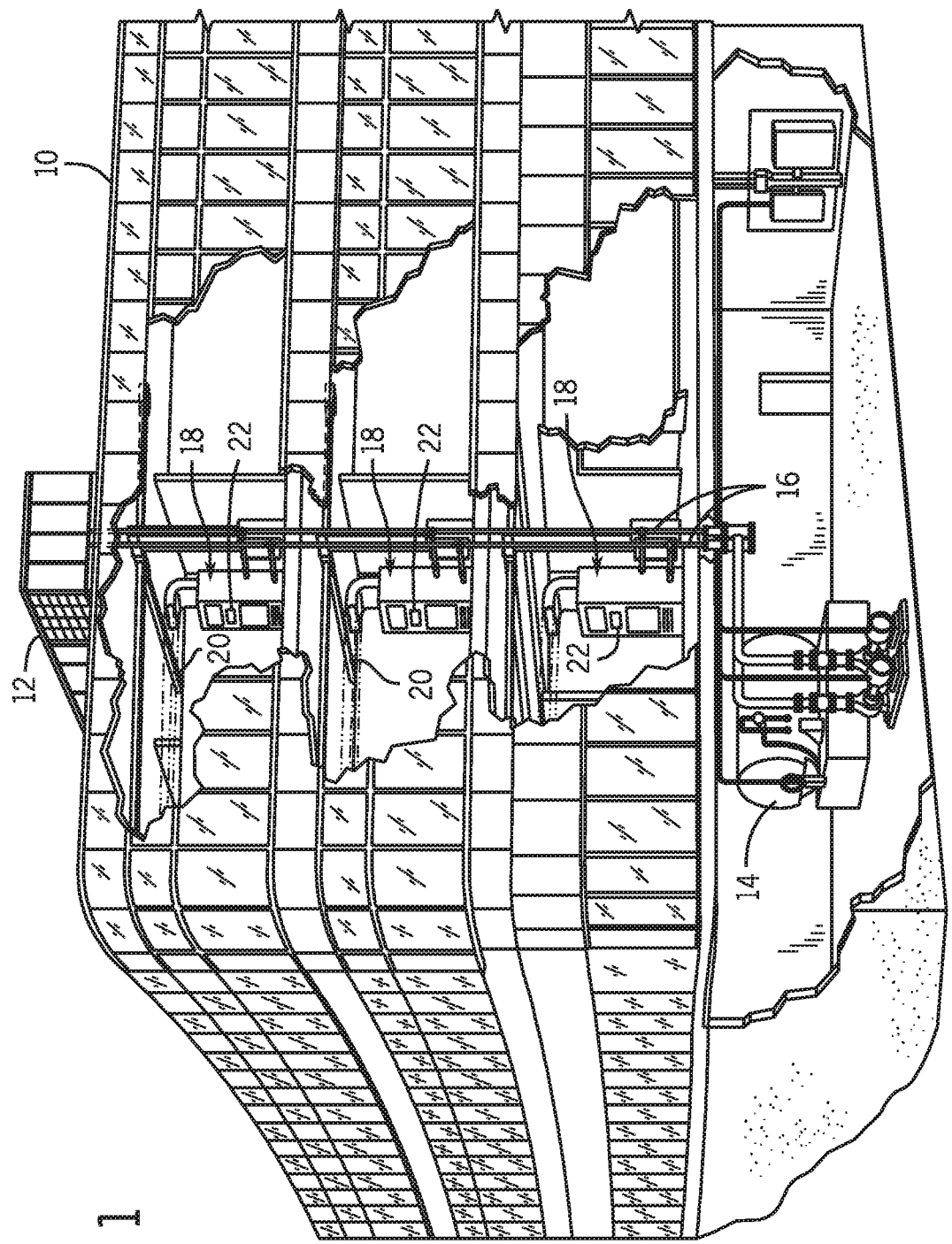
FIG. 1 is perspective view of an exemplary commercial or industrial environment that employs a free cooling refrigeration system.

FIG. 1 depicts an exemplary application for a refrigeration system. Such systems, in general, may be applied in a range of settings, both within the heating, ventilating, air conditioning, and refrigeration (HVAC&R) field and outside of that field. The refrigeration systems may provide cooling to data centers, electrical devices, freezers, coolers, or other environments through vapor-compression refrigeration, absorption refrigeration, or thermoelectric cooling. In presently contemplated applications, however, refrigeration systems may be used in residential, commercial, light industrial, industrial, and in any other application for heating or cooling a volume or enclosure, such as a residence, building, structure, and so forth. Moreover, the refrigeration systems may be used in industrial applications, where appropriate, for basic refrigeration and heating of various fluids.

FIG. 1 illustrates an exemplary application, in this case an HVAC&R system for building environmental management that may employ heat exchangers. A building 10 is cooled by a system that includes a chiller 12 and a boiler 14. As shown, chiller 12 is disposed on the roof of building 10 and boiler 14 is located in the basement; however, the chiller and boiler may be located in other equipment rooms or areas next to the building. Chiller 12 is an air cooled or water cooled device that implements a refrigeration cycle to cool water. Chiller 12 is housed within a single structure that includes a refrigeration circuit, a free cooling system, and associated equipment such as pumps, valves, and piping. For example, chiller 12 may be single package rooftop unit that incorporates a free cooling system. Boiler 14 is a closed vessel that includes a furnace to heat water. The water from chiller 12 and boiler 14 is circulated through building 10 by water conduits 16. Water conduits 16 are routed to air handlers 18, located on individual floors and within sections of building 10.

Air handlers 18 are coupled to ductwork 20 that is adapted to distribute air between the air handlers and may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building 10, such as rooms, apartments or offices, to maintain the environments at a designated temperature. A control device, shown here as including a thermostat 22, may be used to designate the temperature of the conditioned air. Control device 22 also may be used to control the flow of air through and from air handlers 18. Other devices may, of course, be included in the system, such as control valves that regulate the flow of water and pressure and/or temperature transducers or switches that sense the temperatures and pressures of the water, the air, and so forth. Moreover, control devices may include computer systems that are integrated with or separate from other building control or monitoring systems, and even systems that are remote from the building.

Figure 2:
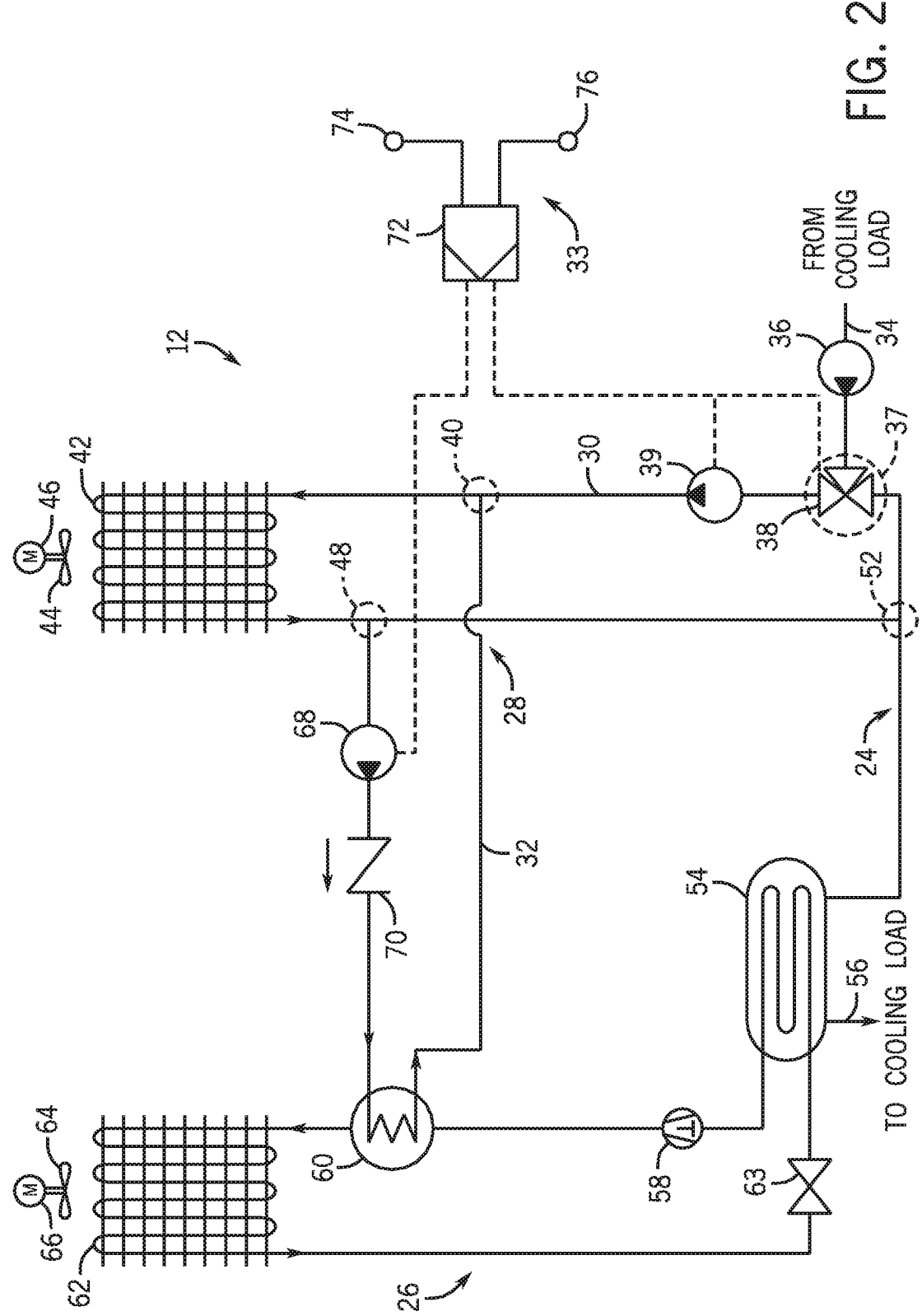
FIG. 2 is a diagrammatical overview of an exemplary free cooling refrigeration system.

FIG. 2 schematically illustrates chiller 12, which incorporates a free cooling system. As noted above with respect to FIG. 1, chiller 12 is housed within a single structure and may be located outside of a building or environment, for example on a roof top. Chiller 12 includes a cooling fluid loop 24 that circulates a cooling fluid, such as chilled water, an ethylene glycol-water solution, brine, or the like, to a cooling load, such as a building, piece of equipment, or environment. For example, cooling fluid loop 24 may circulate the cooling fluid to water conduits 16 shown in FIG. 1. Chiller 12 also includes a refrigeration system loop 26 that is in fluid communication with cooling fluid loop 24 to remove heat from the cooling fluid circulating within the cooling fluid loop 24. Chiller 12 further includes a free cooling system 28 that exploits the low temperature of ambient air in order to cool the cooling fluid circulating within cooling fluid loop 24. In certain embodiments, the cooling fluid may circulate within the cooling fluid loop 24 to a cooling load, such as a research laboratory, computer room, office building, hospital, molding and extrusion plant, food processing plant, industrial facility, machine, or any other environments or devices in need of cooling. Free cooling system 28 includes two circuits 30 and 32 that are each configured to direct the cooling fluid to different portions of free cooling system 28. Chiller 12 also includes a control device 33 that enables chiller 12 to cool the fluid within cooling fluid loop 24 to a prescribed temperature or prescribed range of temperatures.

Chiller 12 may operate in three different modes of operation depending on the requirements of the cooling load and the temperature of the ambient air. When the outside air temperature is low, for example, during winter in northern climates, the chiller 12 may operate in a free cooling mode that directs the cooling fluid through free cooling system 28 before returning the fluid to the cooling load. In this mode of operation, the cooling fluid may be cooled by low temperature outdoor air as the cooling fluid circulates through circuit 30 of free cooling system 28. If additional cooling capacity is desired or needed, chiller 12 may operate in a second mode of operation that employs mechanical cooling, in addition to the free cooling provided by free cooling system 28. During mechanical cooling, refrigeration system 26 may implement a vapor-compression cycle to provide additional cooling for the cooling fluid. For example, in this mode of operation, the cooling fluid may first be cooled by low temperature outdoor air as the cooling fluid circulates through circuit 30 of free cooling system 28. After exiting free cooling system 28, the cooling fluid may undergo further cooling by transferring heat to a refrigerant flowing within refrigeration system 26. To provide even more cooling capacity, chiller 12 may operate in a third mode of operation that employs refrigeration system 26 and the second circuit 32 of the free cooling system 28 to supplement cooling of refrigerant in refrigeration system 26. In this mode of operation, the cooling fluid that circulates to the cooling load may be cooled by refrigerant flowing within refrigeration system 26. Free cooling system 28 may be used to cool the refrigerant flowing within refrigeration system 26. Specifically, a portion of the cooling fluid may be separated from cooling fluid loop 24 and circulated within circuit 32 of free cooling system 28. The cooling fluid within circuit 32 may absorb heat from the refrigerant flowing within refrigeration system 26 to provide additional cooling capacity.

Regardless of the mode of operation, chiller 12 may function to cool the cooling fluid circulating to and from a cooling load, such as a building. The cooling fluid may enter chiller 12 through a return line 34 that is in fluid communication with the cooling load. A pump 36 circulates the cooling fluid through cooling fluid loop 24 and directs the cooling fluid to a connection point 37 that fluidly connects free cooling system 28 to cooling fluid loop 24. A valve 38 may be located at connection point 37 and may direct the cooling fluid to free cooling system 28. In certain embodiments, valve 38 may be a three-way servo controlled valve configured to direct cooling fluid through the free cooling system 28 in one position and to bypass the free cooling system 28 in another position. However, in other embodiments, valve 38 may be a ball valve, rotor valve or the like controlled by electromechanical actuators, pneumatic actuators, hydraulic actuators, or other suitable controls.

The chiller 12 may operate in the first mode, or free cooling mode, of operation when the ambient air temperature is sufficiently low enough to provide free cooling. For example, chiller 12 may operate in the free cooling mode during the winter when outside temperatures are below approximately 12-15 degrees Celsius. However, in other embodiments, the cooling mode determination may depend on a variety of factors such as he cooling requirement of the cooling load, the outside temperature and/or humidity, the type of cooling fluid, and the cooling capacity of the chiller 12 among other things. In the first mode, valve 38 may direct the cooling fluid through the first circuit 30 of free cooling system 28. Within circuit 30, a pump 39 may circulate the cooling fluid through free cooling system 28. The pump may be any suitable type of pump such as a positive displacement pump, centrifugal pump, or the like. From pump 39, the cooling fluid may flow through a connection point 40 that intersects with the second circuit 32 of free cooling system 28. From connection point 40, the cooling fluid may enter an air-to-liquid heat exchanger 42. Heat exchanger 42 may include a fin and tube heat exchanger, brazed aluminum multichannel heat exchanger, or other suitable heat exchanger. The cooling fluid may flow through tubes of heat exchanger 42 to transfer heat to the ambient air. A fan 44, which is driven by a motor 46, draws air across heat exchanger 42. As the air flows across heat exchanger 42, heat may transfer from the cooling fluid to the air, thereby cooling the cooling fluid, and producing heated air. Therefore, the temperature of the cooling fluid exiting heat exchanger 42 may be less than the temperature of the cooling fluid entering heat exchanger 42.

Upon exiting heat exchanger 42, the cooling fluid may flow to a connection point 48 that connects first circuit 30 with the second circuit 32. However, the cooling fluid may not flow through the second circuit in this mode of operation. From connection point 48, the cooling fluid may flow through a connection point 52 to return to cooling fluid loop 24. The cooling fluid may then circulate within cooling loop 24 to an evaporator 54. In this first mode of operation, evaporator 54 may function as a reservoir without providing any substantial evaporating cooling of the cooling fluid. From evaporator 54, the cooling fluid may return to the cooling load through a supply line 56. Supply line 56 may circulate the cooling fluid to the cooling load where the cooling fluid may be heated by the cooling load. For example, the cooling fluid may absorb heat from air within a building or from a fluid flowing within a device. After receiving heat from the cooling load, the cooling fluid may enter chiller 12 through return line 34 where the cooling cycle may begin again.

Chiller 12 may operate in a second mode of operation when the outside air temperature has increased and/or when the outside air temperature is not cool enough to provide efficient cooling to the cooling load. In the second mode of operation, refrigeration system 26 may implement a vapor-compression cycle, or other type of cooling cycle, such as absorption or a thermoelectric cycle, to provide additional cooling for the cooling load. The cooling fluid may flow through free cooling system 28 as previously described with respect to the first mode of operation. As the cooling fluid flows through free cooling system 28, the cooling fluid may transfer heat to the ambient air through heat exchanger 42. The cooling fluid, after being cooled by the ambient air, may flow through connection point 52 and re-enter fluid cooling loop 24.

The cooling fluid may then flow into evaporator 56 where it may be cooled by refrigerant from refrigeration system 26. Evaporator 54 may be a plate heat exchanger, a shell and tube heat exchanger, a plate and shell heat exchanger, or any other suitable type of heat exchanger. Evaporator 54 may circulate refrigerant flowing within a closed loop of refrigeration system 26. The refrigerant may be any fluid that absorbs and extracts heat. For example, the refrigerant may be a hydrofluorocarbon (HFC) based R-410A, R-407C, or R-134a, or it may be carbon dioxide (R-744A) or ammonia (R-717). As the refrigerant flows through evaporator 54, the refrigerant may absorb heat from the cooling fluid flowing within evaporator 54 to cool the cooling fluid before the cooling fluid returns to the cooling load through supply line 56.

Within refrigeration system 26, the refrigerant may circulate through a closed loop including a compressor 58, a heat exchanger 60, a condenser 62, and an expansion device 63. In operation, the refrigerant may exit evaporator 54 as a low pressure and temperature vapor. Compressor 58 may reduce the volume available for the refrigerant vapor, consequently, increasing the pressure and temperature of the vapor refrigerant. The compressor may be any suitable compressor, such as a screw compressor, reciprocating compressor, rotary compressor, swing link compressor, scroll compressor, or centrifugal compressor. The compressor 58 may be driven by a motor that receives power from a variable speed drive or a direct AC or DC power source.

From compressor 58, the high pressure and temperature vapor may flow through a heat exchanger 60 that may function as a receiver in this second mode of operation.

From heat exchanger 60, the high pressure and temperature vapor may flow to condenser 62. A fan 64, which is driven by a motor 66, draws air across the tubes of condenser 62. The fan may push or pull air across the tubes. As the air flow across the tubes, heat transfers from the refrigerant vapor to the air, causing the refrigerant vapor to condense into a liquid and heating the ambient air. The liquid refrigerant then enters an expansion device 63 where the refrigerant expands to become a low pressure and temperature liquid-vapor mixture. Typically, expansion device 63 will be a thermal expansion valve (TXV); however, according to other exemplary embodiments, the expansion device may be an electromechanical valve, an orifice, or a capillary tube. From expansion device 63, the liquid refrigerant may enter evaporator 54 where the process may begin again, and the refrigerant may absorb heat from the cooling fluid flowing through evaporator 54.

Refrigeration system 26 generally includes a high-pressure side and a low-pressure side. The high-pressure side includes the section of refrigeration system 26 that circulates the higher-pressure refrigerant (i.e., after compression and before expansion). Specifically, the high-pressure side includes the section that circulates the refrigerant from compressor 58 through heat exchanger 60, condenser 62, and expansion device 63. The low-pressure side includes the section of refrigeration system 26 that circulates the lower-pressure refrigerant (i.e., after expansion and before compression). Specifically, the low-pressure side includes the portion of refrigeration system 26 that circulates refrigerant from expansion valve 63 through evaporator 54 into compressor 58.

As described above in the second mode of operation, the cooling fluid within cooling loop 24 may be cooled by both the free cooling system 28 and the refrigeration system 26. Specifically, the free cooling system 28 may circulate the cooling fluid through the first circuit 30 to transfer heat from the cooling fluid to ambient air through air-to-liquid heat exchanger 42. After the cooling fluid has been cooled by the ambient air, the cooling fluid may then flow through evaporator 54 where the refrigeration system 26 may further remove heat from the cooling fluid by absorbing heat from the cooling fluid into refrigerant flowing within evaporator 54. In this manner, both free cooling system 28 and the refrigeration system 26 may be used to provide cooling capacity during this second mode of operation.

When even further refrigeration or cooling capacity is desired, chiller 12 may operate in a third mode of operation employing supplemental cooling. In this mode, the cooling fluid may enter chiller 12 through return line 34, flow through pump 36, and through valve 38 at connection point 37. From valve 38, the cooling fluid may flow directly to connection point 52, bypassing free cooling system 28. From connection point 52, the cooling fluid may flow through evaporator 54 where it may be cooled by the refrigerant flowing through the refrigeration system 26. In this third mode of operation, the refrigeration system 26 may receive supplemental cooling from the cooling fluid flowing through heat exchanger 60.

When chiller 12 enters the third mode of operation, a portion of cooling fluid from cooling fluid loop 24 may be isolated, or partially isolated, within the second circuit 32 of free cooling system 28. For example, pump 39 may be disengaged and pump 68 may be enabled to draw cooling fluid through the second circuit 32. The second circuit 32 may circulate cooling fluid from connection point 40 through air-to-liquid heat exchanger 42, pump 68, check valve 70, and heat exchanger 60. As the cooling fluid flows through heat exchanger 60, the cooling fluid may absorb heat from the compressed refrigerant exiting compressor 58 and flowing through heat exchanger 60. Heat exchanger 60 may include a plate heat exchanger, a shell and tube heat exchanger, a plate and shell heat exchanger, or any other suitable type of heat exchanger. In certain embodiments, heat exchanger 60 may function to desuperheat the compressed refrigerant before it enters condenser 62. By transferring heat from the refrigerant to the cooling fluid within the second circuit 32 of free cooling system 28, heat exchanger 60 may provide additional cooling capacity for refrigeration system 26.

As the cooling fluid flows through heat exchanger 60, the cooling fluid may absorb heat from the refrigerant, thereby cooling the refrigerant. The heated cooling fluid may exit heat exchanger 60 and flow through second circuit 32 to connection point 40. From connection point 40, the heated cooling fluid may flow through air-to-liquid heat exchanger 42 where the cooling fluid may be cooled by the ambient air directed through heat exchanger 42 by fan 44. The cooling fluid may then exit heat exchanger 42 and flow through a pump 68 and valve 70. Pump 68 may include any suitable type of pump configured to circulate the cooling fluid through second circuit 32. Valve 70 may include a check valve that prevents the backward flow of cooling fluid through pump 68. However, in other embodiments, pump 68 may include a positive displacement pump with an integrated valve feature that prevents backwards flow. In this embodiment, valve 70 may be eliminated. Further, in other embodiments, valve 70 may be a manually actuated valve, solenoid valve, gate valve, or other suitable type of valve. From valve 70, the cooling fluid may enter heat exchanger 60 where it may again absorb heat from the refrigerant circulating within refrigeration system 26.

Accordingly, during the third mode of operation, heat exchanger 60 may be used to transfer heat from refrigeration system 26 to free cooling system 28. Free cooling system 28 may circulate the heated cooling fluid from heat exchanger 60 to air-to-liquid heat exchanger 42 to expel the heat into the environment. In this manner, air-to-liquid heat exchanger 42 may be used by chiller 12 to remove heat from the system even when the system is not operating in a free cooling mode. For example, second circuit 32 may be used to remove heat from refrigeration system 26 even when environmental air temperatures may be higher then the chilled water supply temperature. Specifically, even though the ambient air temperature may be high, for example above 70 degrees Fahrenheit, the ambient air temperature still may be lower than the temperature of the high pressure and temperature refrigerant flowing within the refrigeration system 26. This temperature difference may enable air-to-liquid heat exchanger 42 to transfer heat from refrigeration system 26 to the environment, thereby increasing the cooling capacity of refrigeration system 26.

The operation of chiller 12 may be governed by control devices 33, which include control circuitry 72 and temperature sensors 74 and 76. Circuitry 72 may be coupled to valve 38 and pumps 39 and 68, which drive the first and second circuits 30 and 32, respectively. Control circuitry 72 may use information received from sensors 74 and 76 to determine when to operate pumps 39 and 68. In some applications, control circuit 72 also may be coupled to motors 46 and 66, which drive fans 44 and 64, respectively. In some applications, control circuit 72 may include local or remote command devices, computer systems and processors, and/or mechanical, electrical, and electromechanical devices that manually or automatically set a temperature related signal that a system receives.

Control circuitry 72 may be configured to switch chiller 12 between the first, second, and third modes of operation based on input received from temperature sensors 74 and 76. Temperature sensor 74 may sense the temperature of the ambient outside air and temperature sensor 76 may sense the temperature of the cooling fluid returning from the cooling load. For example, temperature sensor 76 may be disposed within cooling loop 24. In certain embodiments, when the ambient air temperature sensed by sensor 74 is below the cooling fluid temperature sensed by temperature sensor 76, control circuitry 72 may set chiller 12 to operate in a first mode of operation that employs free cooling by circulating the cooling fluid through the first circuit 30 of free cooling system 28. For example, control circuitry 72 may set valve 38 to direct cooling fluid through free cooling system 28 and may disable pump 68 and compressor 58. Control circuitry 72 may operate chiller 12 in the first mode of operation until the temperature of the ambient air reaches a specified value or is a certain amount above the temperature of the cooling fluid. Control circuitry 72 may then set chiller 12 to operate in the second mode of operation that employs refrigeration system 26, in addition to circulating the cooling fluid through the first circuit 30 of cooling system 28. In certain embodiments, control circuitry 72 may enable compressor 58 and motor 66 to circulate refrigerant through refrigeration system 26. Control circuitry 72 may operate chiller 12 in the second mode of operation until the ambient air temperature reaches another specified value or amount above the cooling fluid temperature or until the cooling fluid temperature rises above a certain threshold. Control circuitry 72 may then switch chiller 12 to the third mode of operation that employs the second circuit 32 of free cooling system 28 to remove heat from refrigeration system 26. For example, control circuitry 72 may then disable pump 39 and enable pump 68 to circulate a portion of the cooling fluid through the second circuit 32.

The control circuitry may be based on various types of control logic that uses input from temperature sensors 74 and 76. Control circuitry 72 also may control other valves and pumps disposed within the refrigeration system. Further, additional inputs such as flow rates, pressures, and other temperature may be used in controlling the operation of chiller 12. For example, other devices may be included in chiller 12, such as additional pressure and/or temperature transducers or switches that sense temperatures and pressures of the refrigerant and cooling fluid, the heat exchangers, the inlet and outlet air, and so forth. Further, the examples provided for determining the mode of operation are not intended to be limiting. Other values and set points based on a variety of factors such as system capacity, cooling load, and the like may be used to switch chiller 12 between the first, second, and third modes of operation.

The pump and valve configurations included in FIG. 2 are shown by way of example only and are not intended to be limiting. For example, the locations, numbers, and types of pumps and valves may vary. In one example, pump 39 may be eliminated and pump 36 may circulate the cooling fluid through free cooling system 28. Pump 39 also may be located anywhere within first circuit 30, and pump 68 may be located anywhere within second circuit 32. In certain embodiments, valve 38 may be eliminated, if, for example, pump 39 is equipped with a positive shutoff feature. In another example, pumps 68 and 39 may be equipped with positive shutoff features and valves 70 and 38 may be eliminated. In yet another example, valve 38 may be located at connection point 40, 48, or 52. Further valve 38 may be replaced by two two-way valves. For example, in one embodiment, a first two-way valve may be located between connection points 38 and 40 or between connection points 48 and 52 and a second two-way valve may be located between connection points 38 and 52. Of course, many other pump and valve configurations may be envisaged and employed in chiller 12.

Figure 3:
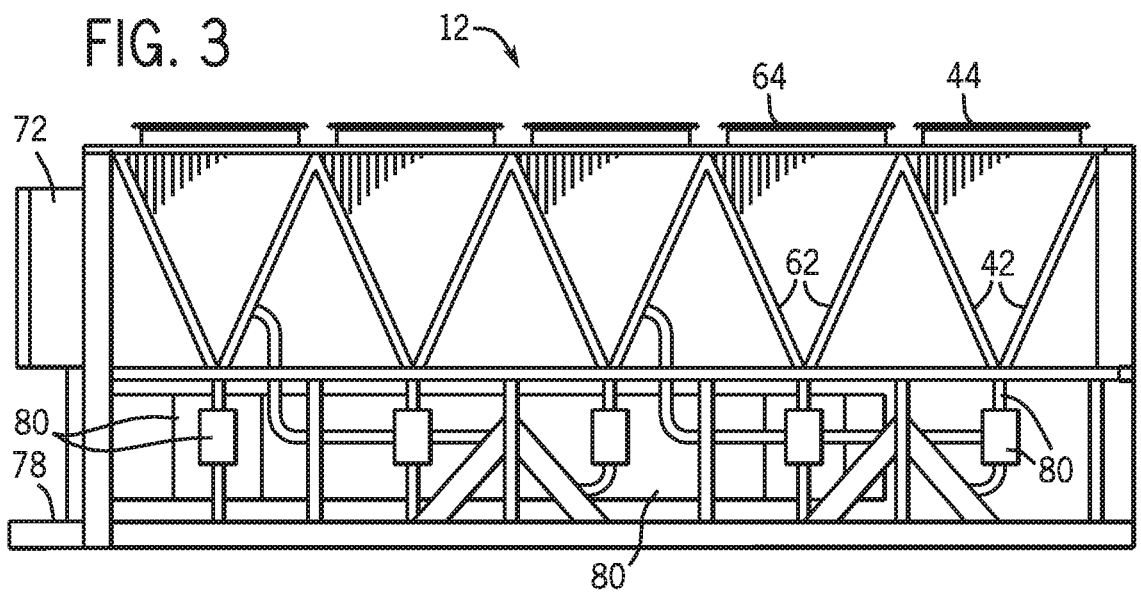
FIG. 3 is an elevational view of the free cooling refrigeration system shown in FIG. 2.

FIG. 3 is an elevational view of chiller 12. Chiller 12 may be housed completely within a single cabinet or support frame 78. In certain embodiments, support frame 78 may be a box-shaped structure composed of metal panels. Control circuit 72 may be mounted on support frame 78 that houses equipment 80, such as pumps, compressors, heat exchangers, valves, piping, and the like, included within chiller 12. In certain embodiments, the air-to-liquid heat exchangers 42 and 62 may be disposed in adjacent V-shaped configurations within support frame 78. Each heat exchanger 42 and 62 may include two heat exchanger slabs disposed beneath fans 44 and 64. However, in other embodiments, the number of slabs within each heat exchanger may vary. Further, additional heat exchanger slabs may be connected in series to provide additional cooling capacity. In certain embodiments, the free cooling system heat exchanger 42 may be disposed towards the outside of the cabinet 78 such that the heat exchanger 42 may receive the coolest environmental air.

Figure 4:
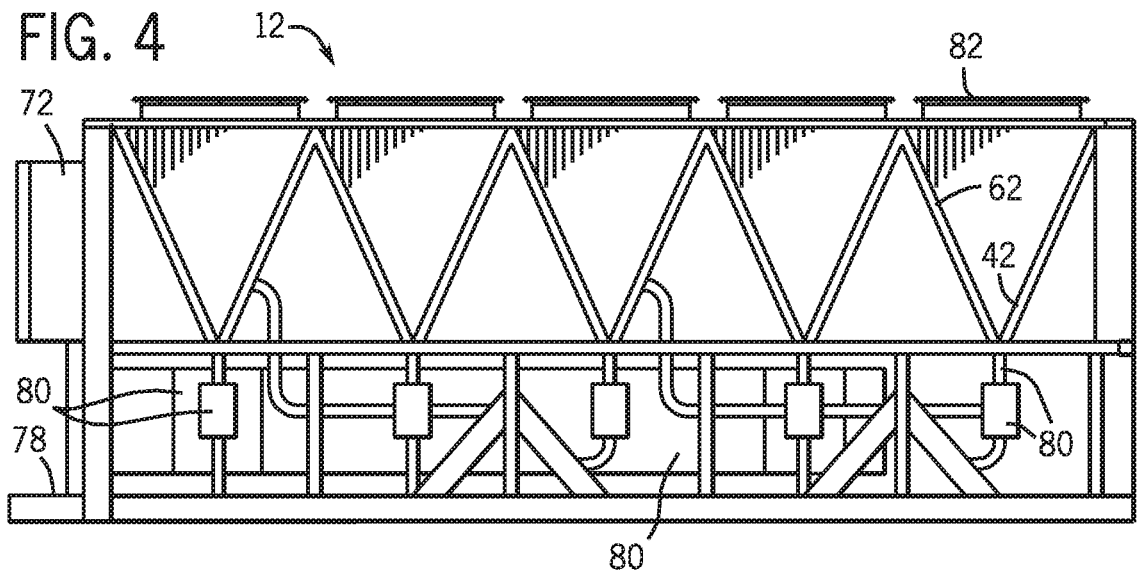
FIG. 4 is an elevational view of an exemplary free cooling refrigeration system employing air-to-liquid heat exchangers that share a fan.

FIG. 4 shows an alternate heat exchanger configuration for chiller 12. In this configuration, heat exchangers 42 and 62 share a common fan 82. The heat exchangers may be disposed in a V-shaped configuration with air-to-liquid heat exchanger 42 on one side and condenser 62 on the other side. Shared fan 82 may draw air over both heat exchangers 42 and 62. In certain embodiments, the use of a common fan configuration may reduce equipment costs.

Figure 5:
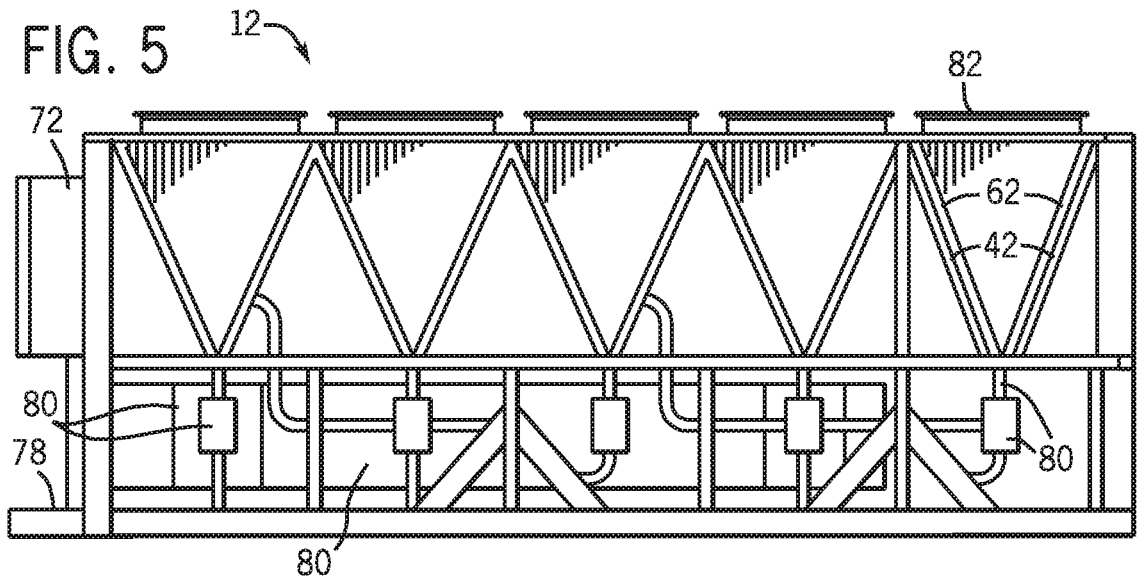
FIG. 5 is an elevational view of an exemplary free cooling refrigeration system employing liquid-to air heat exchangers in a multi-slab configuration.

FIG. 5 illustrates another heat exchanger configuration, where air-to-liquid heat exchanger 42 and condenser 62 are disposed in a multi-slab configuration to share common fan 82. In this configuration, the slabs of each heat exchanger 42 and 62 are disposed adjacent to each other. However, the configurations illustrated in FIGS. 3 through 5 are provided by way of example only and are not intended to be limiting. For example, depending on factors such as system capacity, cooling load requirements, piping configurations, climate temperatures, and average humidity, among other things, the number of slabs within heat exchangers 42 and 62 may vary. Further, multiple slabs may be connected in series to provide additional cooling capacity. Moreover, the heat exchangers may include various multi-slab configurations, additional V-shaped configurations, and additional heat exchangers.

Figure 6:
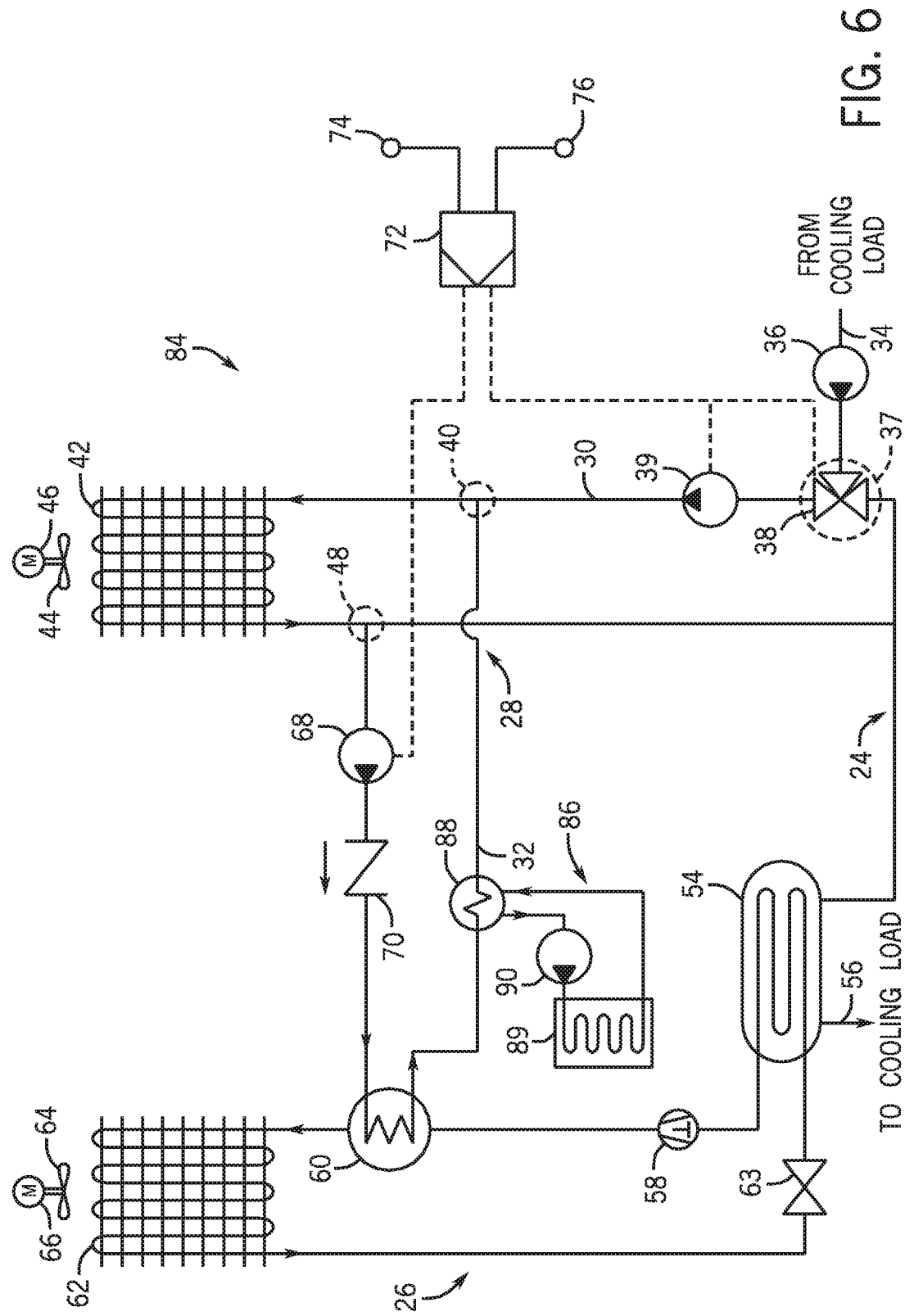
FIG. 6 is a diagrammatical overview of an exemplary free cooling refrigeration system employing a heat recovery loop.

FIG. 6 illustrates another exemplary chiller 84 that includes free cooling system 28, cooling loop 24, and refrigeration system 26. Chiller 84 also includes a heat recovery loop 86 disposed within the second circuit 32 of free cooling system 28. The heat recovery loop 86 includes a closed loop that circulates through a heat exchanger 88 located within second circuit 32. Heat exchanger 88 allows heat to be transferred from the cooling fluid flowing within second circuit 32 to a device 89 in fluid communication with heat recovery loop 86. Device 89 may be any device that utilizes an input of heat. For example, device 89 may be a water heater, space heater, or other device. A pump 90 circulates a fluid, such as water or any suitable refrigerant, within closed loop 86. As the fluid flows through device 89, for example, within a coil disposed in device 89, the fluid may transfer heat to an interior volume of device 89. In certain embodiments, pump 90 may be controlled by control circuitry 72 and enabled to provide heat to device 89 when chiller 84 is operating in the third mode of operation. Further, in certain embodiments, device 89 may be housed outside of chiller 84 and connected to the chiller via piping. Moreover, additional equipment, such as bypass valve, pumps, and the like, may be included in the chiller 84.

Figure 7:
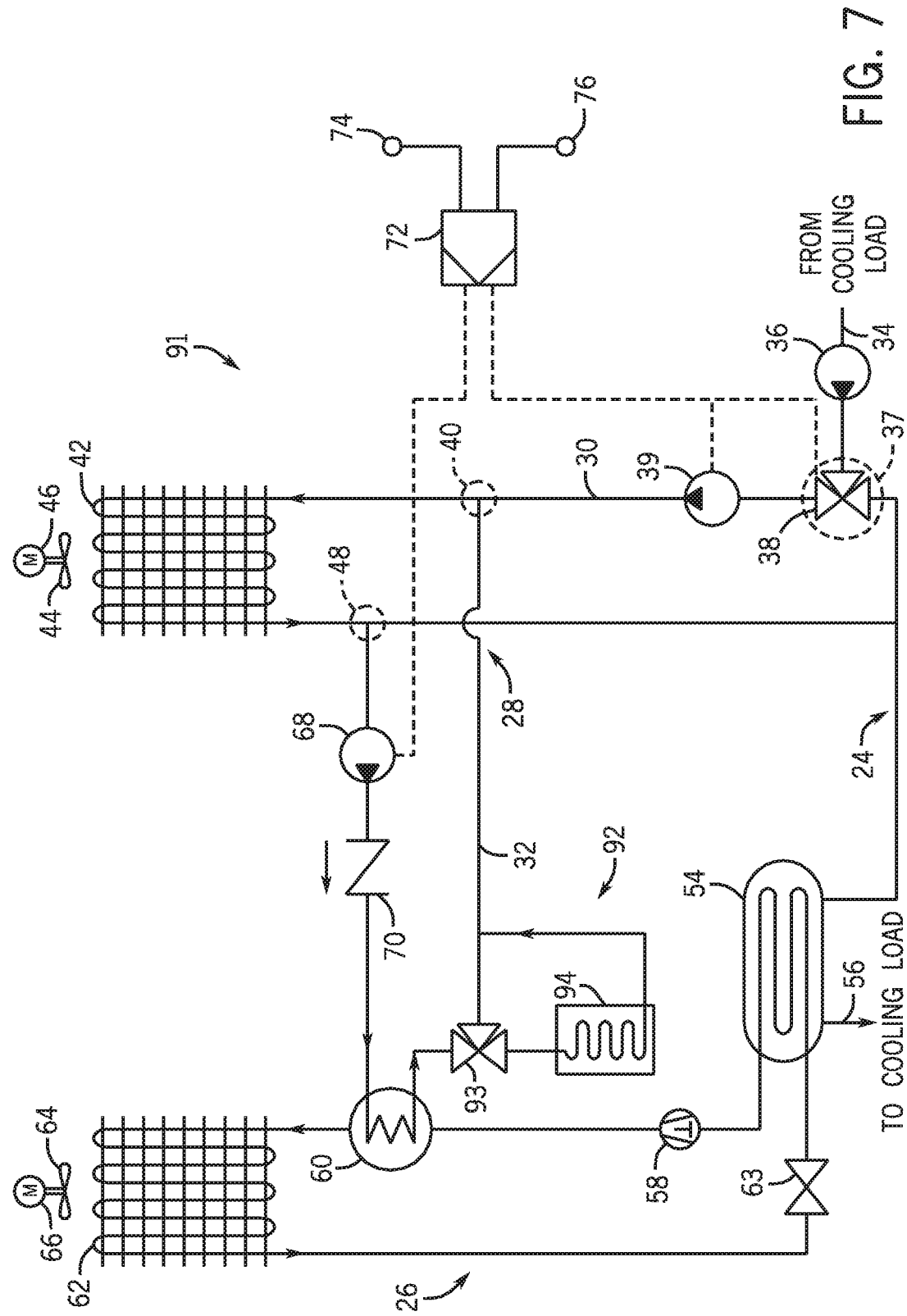
FIG. 7 is a diagrammatical overview of another exemplary free cooling refrigeration system employing a heat recovery loop.

FIG. 7 illustrates another chiller 91 that includes an alternate heat recovery loop 92. Heat recovery loop 92 is in fluid communication with second circuit 32 and includes a three-way valve 93 configured to direct cooling fluid exiting heat exchanger 60 through heat recovery loop 92. The cooling fluid may be circulated through valve 93 to a device 94 to transfer heat from the cooling fluid to device 94. Device 94 may be any device that utilizes input of heat, such as a water heater, space heater, or other suitable device. In certain embodiments, control circuitry 72 may be connected to valve 93 to govern operation of valve 93. When heat is required within device 94, the valve 93 may be set to direct fluid to heat recovery loop 92. However, when no heat input is desired, the valve 93 may be set to bypass heat recovery loop 92. In certain embodiments, heat recovery loop 92 may be used to provide reheat for humidity control within a system. For example, device 94 may be an air duct within a building where air is cooled below a set point to reduce humidity. The cooled air may be reheated by heat recovery loop 92. In other embodiments, device 94 may be a water heater or a space heater. Moreover, additional equipment, such as bypass valve, pumps, and the like, may be included in the chiller 91.

Figure 8:
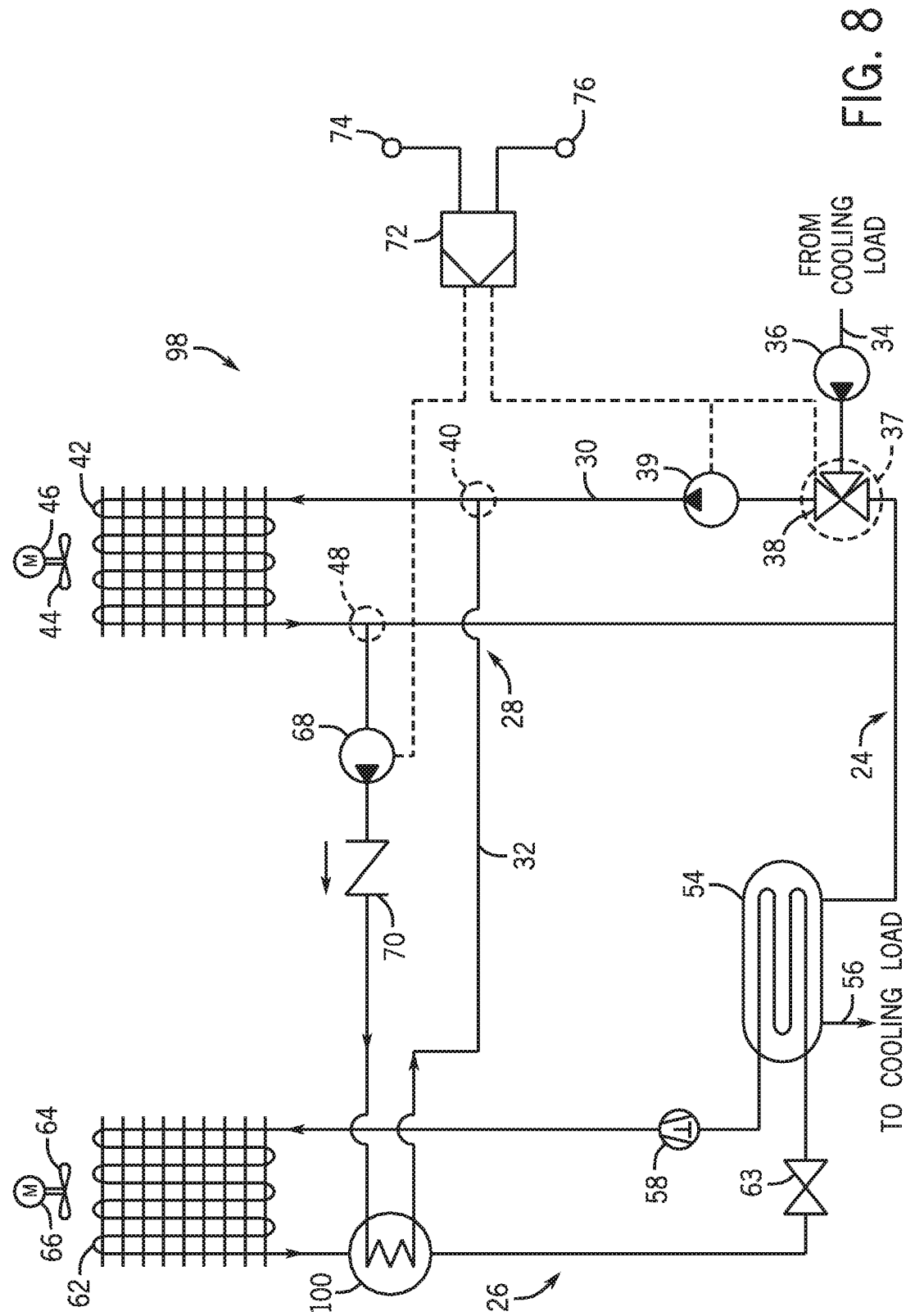
FIG. 8 is a diagrammatical overview of an exemplary free cooling refrigeration system showing an alternate location for the common heat exchanger.

FIG. 8 illustrates another exemplary chiller 98 that includes a heat exchanger 100 for transferring heat from refrigeration system 26 to free cooling system 28. Heat exchanger 100 is located downstream of condenser 62 and may be employed when chiller 98 is operating in the third mode of operation. Heat exchanger 100 may receive condensed, or partially condensed, refrigerant from condenser 62 and may function to further condense and/or subcool the refrigerant by transferring heat from the refrigerant to the cooling fluid circulating within the second circuit 32 of free cooling system 28.

Figure 9:
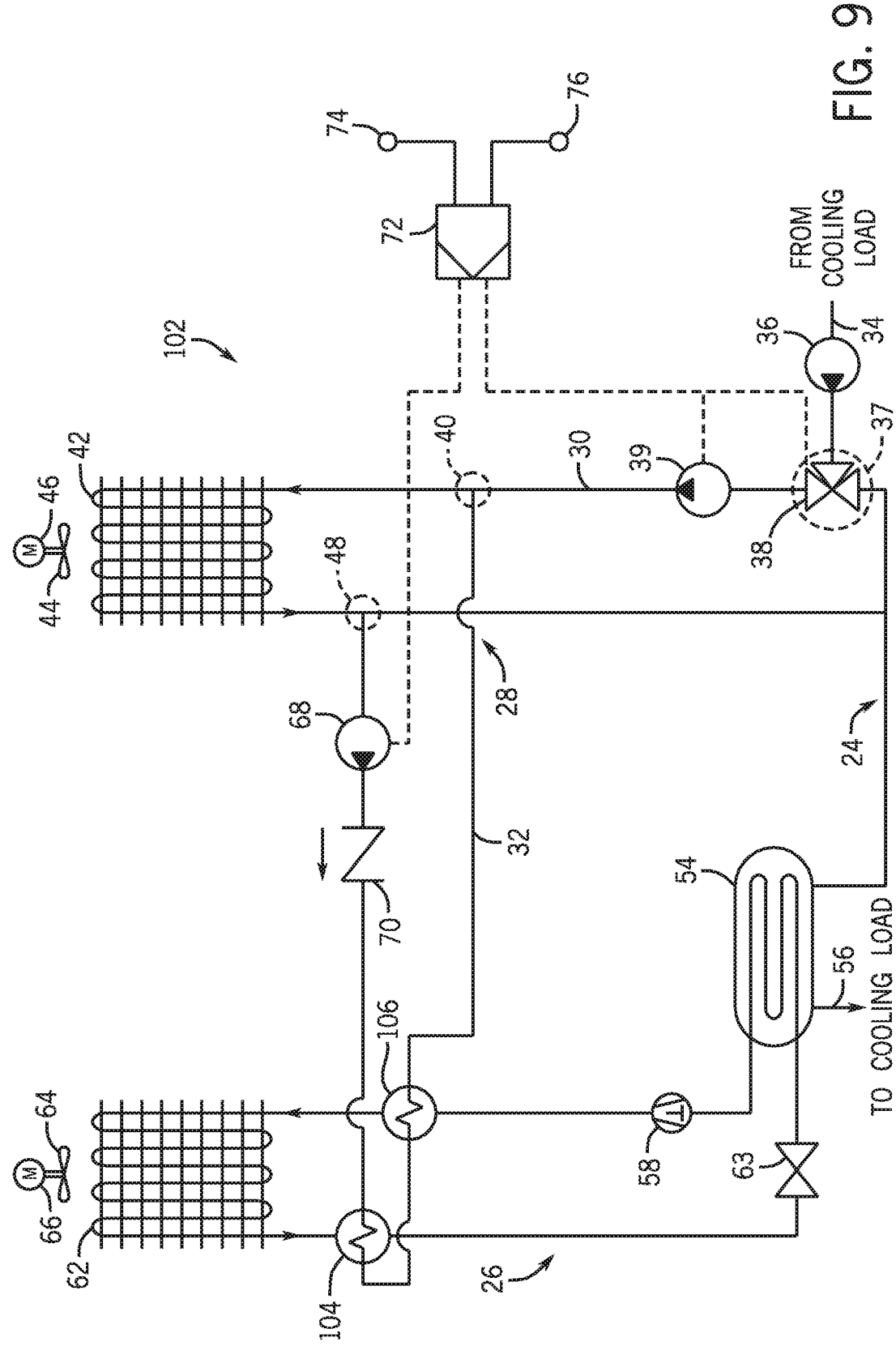
FIG. 9 is a diagrammatical overview of an exemplary free cooling refrigeration system employing two common heat exchangers.

FIG. 9 illustrates yet another exemplary chiller 102 that employs two heat exchangers 104 and 106 that may transfer heat from refrigeration system 26 to the second circuit 32 of free cooling system 28. Heat exchanger 106 is located upstream of condenser 62 and may desuperheat the compressed refrigerant exiting condenser 58. From heat exchanger 106, the refrigerant may enter condenser 62, where the refrigerant may be condensed, or partially condensed. Heat exchanger 104 is located downstream of condenser 62 and may further condense and/or subcool the refrigerant exiting condenser 62.

As the refrigerant flows through heat exchangers 104 and 106, the refrigerant may transfer heat to the cooling fluid within circuit 32. Chiller 102 is configured so that heat exchanger 104 receives the cooling fluid from air-to-liquid heat exchanger 42 before directing the cooling fluid to heat exchanger 106. In this manner, the relatively cooler cooling fluid may be used for subcooling the condensed, or partially condensed, refrigerant exiting condenser 62. After the cooling fluid has been heated by flowing through heat exchanger 104, the relatively warmer cooling fluid may be used to desuperheat the higher temperature refrigerant entering condenser 62. In other embodiments, however, the chiller may be configured so heat exchanger 106 receives the cooling fluid before heat exchanger 104.

Figure 10:
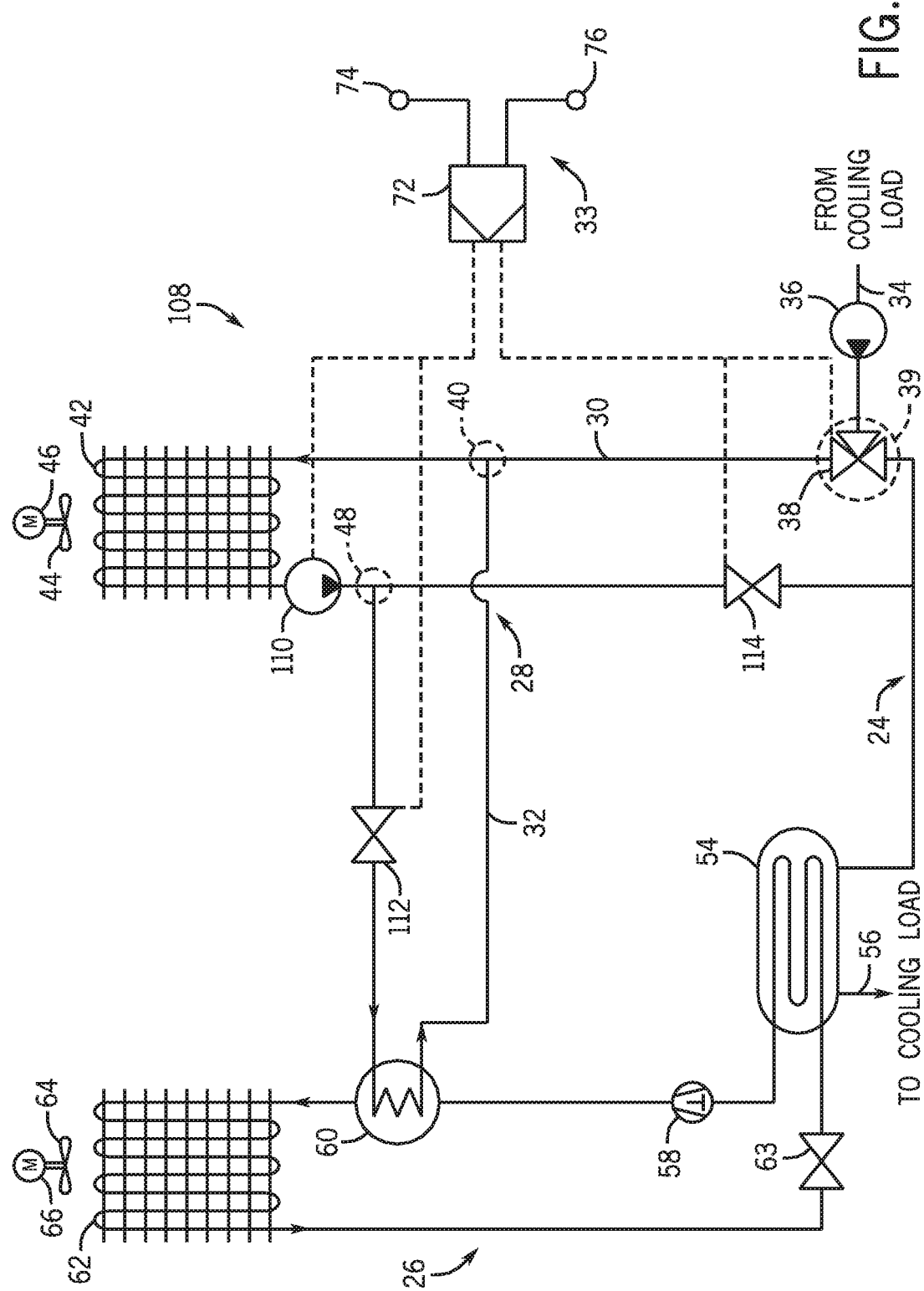
FIG. 10 is a diagrammatical overview of an exemplary free cooling refrigeration system illustrating another pump and valve configuration.

As described above with respect to FIG. 2, various pump and valve configurations may be employed within the chiller. FIG. 10 illustrates another exemplary chiller 108 incorporating an alternate pump and valve configuration. A pump 110 may be disposed within part of the free cooling system that is common to the first and second circuits 30 and 32 so that only one pump may be employed in free cooling system 28. A two-way valve 112 may be located within the second circuit 32 and another two-way valve 114 may be located within the first circuit 30. Two-way valves 112 and 114 may be connected to control circuitry 72 to selectively direct the cooling fluid to either first circuit 30 or second circuit 32, depending on the mode of operation. When the system is operating in the first or second modes of operation that employ free cooling, valves 112 and 114 may be configured to circulate cooling fluid thought the first circuit 30 as described above with respect to FIG. 2. When the system is operating in the third mode of operation to remove heat from refrigeration system 26, valves 112 and 114 may be configured to circulate a portion of the cooling fluid within the second circuit 32. Pump 110 may be disposed at the exit of air-to-liquid heat exchanger 42. Of course, the locations of pump 110 and valves 112 and 114 may vary. For example, in other embodiments, pump 110 may be located at the entrance to air-to-liquid heat exchanger 42. In another example, valve 114 may be located between connection points 39 and 40. Further, additional pumps, valves, sensors, transducers, and the like may be included within the exemplary chiller systems described herein.

Figure 11:
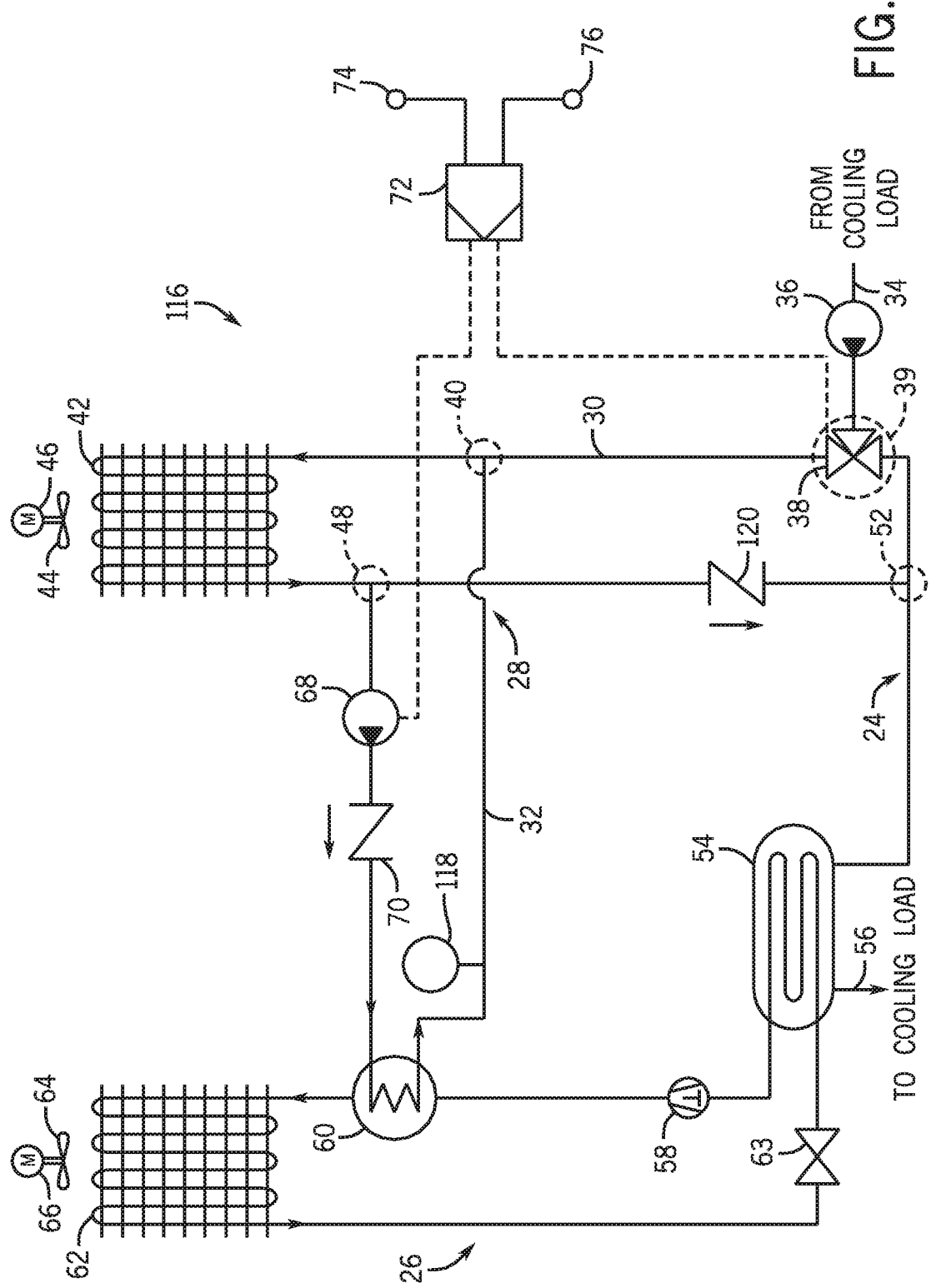
FIG. 11 is a diagrammatical overview of an exemplary free cooling refrigeration system illustrating yet another pump and valve configuration.

FIG. 11 illustrates yet another exemplary chiller 116 incorporating an alternate pump and valve configuration that employs an expansion tank 118. Expansion tank 118 is located within the second circuit 32 of free cooling system 38 and may allow for thermal expansion when a portion of the cooling fluid is circulated within the second circuit 32 during the third mode of operation. Expansion tank 118 may be any suitable type of tank or vessel, and may normally include trapped gas to accommodate changes in liquid volume. A check valve 120 is disposed within the first circuit 30 to prevent the cooling fluid from flowing backwards through free cooling system 28. As described above with respect to FIG. 2, three-way valve 38 may direct cooling fluid into free cooling system 28. During the first and second modes of operation, the cooling fluid may flow through the first circuit 30 of free cooling system 28 as described above with respect to FIG. 2. During the third mode of operation, a portion of the cooling fluid may be isolated within the second circuit 32 and pump 68 may be engaged to circulate the isolated cooling fluid through the second circuit 32 to remove heat from refrigeration system 26. As the temperature changes and the cooling fluid expands or contracts, a portion of the cooling fluid may be stored, or circulated within, expansion tank 118. In other embodiments, the expansion tank may be disposed within any portion of the second circuit 32. Further, the location of the valves may vary. For example, in certain embodiments, a three-way valve may be located at connection point 52 and check valve 120 may be located between connection points 39 and 40.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A refrigeration system, comprising:
  a free cooling system configured to exchange heat between a cooling fluid and ambient air via a first heat exchanger;
  a vapor-compression system comprising a second heat exchanger configured to exchange heat between a refrigerant and the cooling fluid, wherein the second heat exchanger places the refrigerant in indirect thermal communication with the ambient air via the first heat exchanger;
  a third heat exchanger of the vapor-compression system, wherein the third heat exchanger is configured to place the refrigerant in direct thermal communication with the ambient air, such that the first heat exchanger and the third heat exchanger simultaneously exchange heat between the refrigerant and the ambient air, and wherein the second heat exchanger and the third heat exchanger are positioned on a high pressure side of the vapor-compression system;
  a fourth heat exchanger of the vapor-compression system, wherein the fourth heat exchanger is downstream of the third heat exchanger on a low pressure side of the vapor-compression system, and wherein the fourth heat exchanger places the refrigerant in thermal communication with the cooling fluid;
  a first circuit of the free cooling system, wherein the first circuit extends from a load through the first heat exchanger, through the fourth heat exchanger, and back to the load; and
  a second circuit of the free cooling system, wherein the second circuit extends from an exit of the first heat exchanger, through the second heat exchanger, and back to an inlet of the first heat exchanger; and
  control circuitry configured to adjust the refrigeration system between first, second, and third modes of operation based on an ambient air temperature value detected by an ambient temperature sensor and a cooling fluid temperature value detected by a cooling fluid temperature sensor;
    wherein the control circuitry is configured to operate the refrigeration system in the first mode of operation, based on a determination that the ambient air temperature value is below the cooling fluid temperature value, to circulate the cooling fluid through the first circuit without operating the vapor-compression system;
    wherein the control circuitry is configured to operate the refrigeration system in the second mode of operation, based on a determination that the ambient air temperature value exceeds a first threshold value greater than the cooling fluid temperature value, to circulate the cooling fluid through the first circuit and operate the vapor-compression system; and wherein the control circuitry is configured to operate the refrigeration system in the third mode of operation, based on a determination that the ambient air temperature value exceeds a second threshold value greater than the first threshold value, to circulate an isolated portion of the cooling fluid through the second circuit, operate the vapor-compression system, and circulate a remaining portion of the cooling fluid from the load directly to the fourth heat exchanger and back to the load.

2. The refrigeration system of claim 1, wherein the second circuit comprises an expansion tank between the second heat exchanger and the inlet of the first heat exchanger, and wherein the expansion tank is configured to thermally expand the cooling fluid.

3. The refrigeration system of claim 1, wherein the second circuit comprises a heat recovery loop between the second heat exchanger and the inlet of the first heat exchanger, and wherein the heat recovery loop is configured to exchange heat between the cooling fluid and a device.

4. The refrigeration system of claim 3, wherein the device is a water heater, or a space heater, or both.

5. The refrigeration system of claim 1, wherein the vapor-compression system further comprises:
a compressor disposed between the fourth heat exchanger and the second heat exchanger, wherein the compressor is configured to compress the refrigerant; and
an expansion device disposed between the third heat exchanger and the fourth heat exchanger, wherein the expansion device is configured to reduce a pressure of the condensed refrigerant.

6. The refrigeration system of claim 1, wherein the second circuit comprises a pump configured to circulate the cooling fluid between the first heat exchanger and the second heat exchanger.

7. The refrigeration system of claim 1, comprising a fifth heat exchanger positioned between the exit of the first heat exchanger and an inlet of the second heat exchanger, and downstream of the third heat exchanger in the vapor-compression system, wherein the fifth heat exchanger is configured to transfer heat from the refrigerant to the cooling fluid to subcool the refrigerant.

8. The refrigeration system of claim 1, comprising a valve configured to direct the cooling fluid from the load to the first circuit of the free cooling system before the cooling fluid enters the fourth heat exchanger.

9. The refrigeration system of claim 1, wherein the cooling fluid comprises water, a brine solution, a glycol solution, or a combination thereof.

10. The refrigeration system of claim 1, wherein the free cooling system and the vapor-compression system are disposed within a single enclosure.

11. The refrigeration system of claim 1, wherein the first heat exchanger and the third heat exchanger are configured to share a common fan to exchange heat between the refrigerant and ambient air.

12. A method for operating a refrigeration system, comprising:
comparing an ambient temperature value with a cooling fluid temperature value, a first threshold greater than the cooling fluid temperature value, and a second threshold that is greater than the first threshold;
switching between first, second, and third modes of operation based on comparison of the ambient temperature value with the cooling fluid temperature value, the first threshold, and the second threshold;
operating in the first mode based on the ambient air temperature value being below the cooling fluid temperature value, wherein operating in the first mode comprises circulating a cooling fluid through a first circuit of a free cooling system, wherein the first circuit extends from a load, through a first heat exchanger configured to place the cooling fluid in direct thermal communication with ambient air, through a second heat exchanger of a vapor-compression system, and back to the load;
operating in the second mode based on the ambient air temperature value exceeding the first threshold, wherein operating in the second mode comprises circulating the cooling fluid through the first circuit of the free cooling system and operating the vapor-compression system, wherein the vapor-compression system is configured to circulate the refrigerant through the second heat exchanger and through a third heat exchanger configured to place a refrigerant in direct thermal communication with ambient air;
operating in the third mode based on the ambient air temperature value exceeding the second threshold, wherein operating in the third mode comprises circulating an isolated portion of the cooling fluid through a second circuit of the free cooling system, circulating a remaining portion of the cooling fluid directly from the load through the second heat exchanger and back to the load, and operating the vapor-compression system, wherein the second circuit extends from an exit of the first heat exchanger, through a fourth heat exchanger configured to place the cooling fluid in direct thermal communication with the refrigerant, and to an inlet of the first heat exchanger, wherein the fourth heat exchanger places the refrigerant in indirect thermal communication with the ambient air via the first heat exchanger, such that the first heat exchanger and the third heat exchanger simultaneously exchange heat between the refrigerant and the ambient air, and wherein the third heat exchanger and the fourth heat exchanger are positioned on a high pressure side of the vapor-compression system.

13. The method of claim 12, comprising exchanging energy between the isolated portion of the cooling fluid and the refrigerant within the vapor-compression refrigeration system to partially condense or desuperheat the refrigerant.

14. The method of claim 12, wherein switching between first, second, and third modes comprises adjusting a position of at least one valve to direct the cooling fluid through the first circuit or the second circuit.

15. A refrigeration system, comprising:
a vapor-compression system configured to circulate a refrigerant through a first heat exchanger, wherein the first heat exchanger is configured to place the refrigerant in direct thermal communication with ambient air;
a free cooling system configured to circulate a cooling fluid through a second heat exchanger and a third heat exchanger, wherein the second heat exchanger is common to the vapor-compression system and the free-cooling system, wherein the second heat exchanger is configured to place the refrigerant in direct thermal communication with the cooling fluid, and wherein the third heat exchanger is configured to place the cooling fluid in direct thermal communication with the ambient air, such that the second heat exchanger places the refrigerant in indirect thermal communication with ambient air via the third heat exchanger, wherein the first heat exchanger and the third heat exchanger are configured to simultaneously exchange heat between the refrigerant and the ambient air, and wherein the free cooling system comprises:
  a first circuit extending from a load through the third heat exchanger, through a fourth heat exchanger shared between the vapor-compression system and the free cooling system, and back to the load; and
  a second circuit extending from an exit of the third heat exchanger, through the second heat exchanger, and to an inlet of the third heat exchanger; and
a controller configured to:
  compare a temperature of the ambient air with a temperature of the cooling fluid, a first threshold greater than the temperature of the cooling fluid, and a second threshold greater than the first threshold to operate the refrigeration system in a first mode, a second mode, or a third mode, respectively, based on the comparison;
  operate the refrigeration system in the first mode, based on the comparison indicating the temperature of the ambient air is below the temperature of the cooling fluid, to circulate the cooling fluid through the first circuit without operating the vapor-compression system;
  operate the refrigeration system in the second mode, based on the comparison indicating the temperature of the ambient air exceeds the first threshold, to circulate the cooling fluid through the first circuit to cool the cooling fluid via free cooling and operate the vapor-compression system to cool the cooling fluid via the refrigerant; and
  operate the refrigeration system in the third mode, based on the comparison indicating the temperature of the ambient air exceeds the second threshold, to circulate a first portion of the cooling fluid through the second circuit during operation of the vapor-compression system and circulate a second portion of the cooling fluid from the load directly to the fourth heat exchanger and back to the load.

16. The refrigeration system of claim 15, wherein the controller is configured to adjust one or more valves to selectively direct the cooling fluid through the first circuit or through the second circuit based on the temperature of the ambient air.

17. The refrigeration system of claim 15, wherein the third heat exchanger comprises an air-to-liquid heat exchanger configured to receive the cooling fluid from the first circuit or the second circuit, and wherein the third heat exchanger is configured to remove heat from the cooling fluid.

* * * * *